Figure 1:
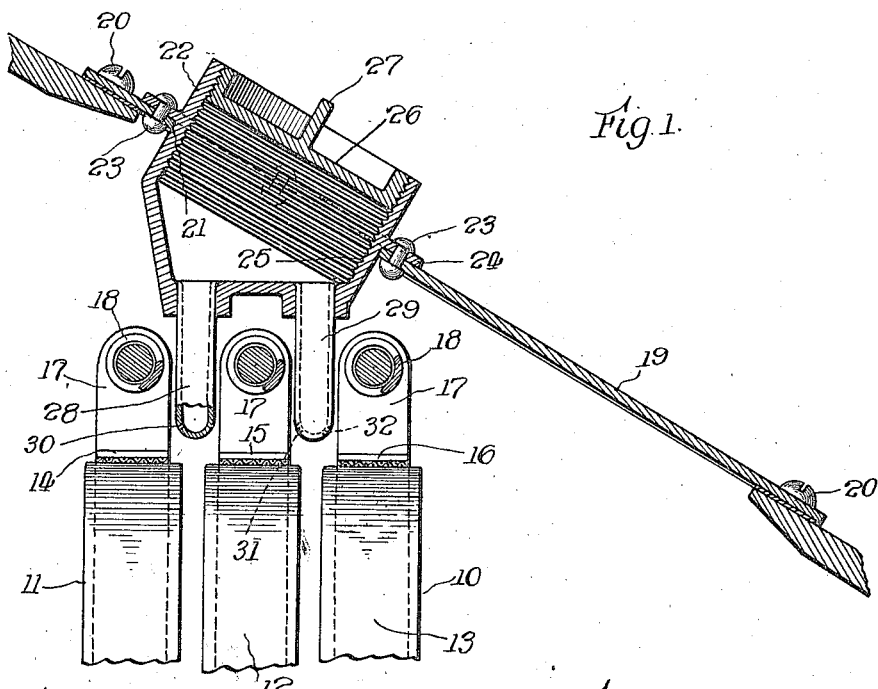

Aug. 14, 1923.

A. J. EVERS 1,464,502

TRANSMISSION GREASING APPLIANCE

Filed April 1, 1921

Witness:
A. J. Sauser.

Inventor
Arthur J. Evers
By Walter M. Fuller

Patented Aug. 14, 1923.

1,464,502

UNITED STATES PATENT OFFICE.

ARTHUR J. EVERS, OF CHICAGO, ILLINOIS, ASSIGNOR TO EVERS-SAUVAGE COMPANY, OF CHICAGO, ILLINOIS, A CORPORATION OF ILLINOIS.

TRANSMISSION-GREASING APPLIANCE.

Application filed April 1, 1921. Serial No. 457,613.

*To all whom it may concern:*

Be it known that I, ARTHUR J. EVERS, a citizen of the United States, residing at Chicago, in the county of Cook and State of Illinois, have invented certain new and useful Improvements in Transmission-Greasing Appliances, of which the following is a specification.

Automobiles or internal-combustion motor vehicles equipped with a planetary or epicyclic transmission mechanism, such as those of the Ford type, having a plurality of rotary drums, known respectively as the reverse drum, slow speed drum, and foot brake drum, and their encircling cooperating expansible and contractible bands are subject to at least one serious disadvantage.

Even though these elements operate in oil, the linings of such bands which are subject to more or less frequent use become hardened or charred or otherwise deteriorated with the result that they do not engage and release their respective drums smoothly and gradually, but rather they cause a violent and disagreeable chattering or vibration of the whole mechanism when starting or stopping the vehicle.

It might reasonably be assumed that the oil in the transmission casing or housing would cause an easy, smooth, gradual engagement and release of the bands, but such is not the case after the bands have become somewhat worn.

Heretofore, it has been necessary after the bands have become thus impaired to remove them and replace their linings with new material.

Such work, however, is somewhat difficult if done properly and is necessarily more or less expensive and before very long the new linings will have become deteriorated again introducing the severe and intense quivering and shaking detrimental to the whole mechanism and extremely unpleasant to the occupants of the vehicle.

I have discovered that this fault and defect in this style of mechanism may be easily and effectively overcome or remedied at small cost.

Apparently the oil used in the transmission casing is inadequate to keep the band linings in relatively soft and efficient condition and I have found that they can be maintained in such effective and operative state by occasionally applying grease to them, such grease for instance as is ordinarily used in connection with the lubrication of other parts of the vehicle, for example spring shackle bolts, etc., such grease usually being of the general consistency of vaseline or possibly somewhat stiffer.

An occasional application of such grease, the frequency of use, of course, depending upon the extent of travel to which the vehicle is subjected, is quite adequate to keep the car in smooth running condition and to prolong the life of the band linings.

The improved appliance by means of which the grease is delivered to such bands need not necessarily be built into the car originally but may be readily and economically applied to cars already in use.

To this end the greasing device in its simplest form is mounted on a cover for the transmission casing, such cover being intended to replace the usual cover.

It would be difficult to apply such grease directly between the bands and their drums owing to the small intervening spaces, and accordingly I have found it convenient to deliver the charges of grease to the drums between the ends of their surrounding bands, the drums at once carrying the grease to and applying it to the lining of such bands.

To enable those skilled in this art to have a full and complete understanding of the invention both from structural and functional standpoints, I have illustrated a desirable and preferred embodiment of the invention in the accompanying drawing forming a part of this specification and to which reference should be had in connection with the following detailed description of the structure.

Figure 2:
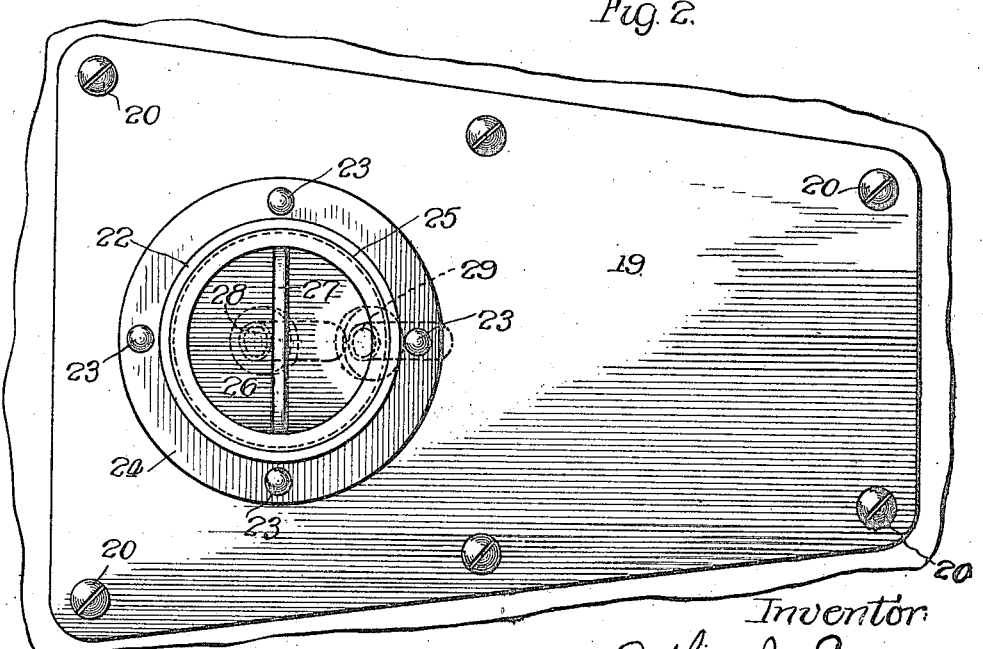

In this drawing, in both views of which like reference characters have been employed to represent the same parts, Figure 1 is a central vertical section, fragmentary in character, illustrating not only the improved greasing appliance but also a portion of the transmission mechanism in order that the relation of the two may be fully comprehended; and Figure 2 is a fragmentary plan view of the cover portion of the transmission casing equipped with the greasing device.

Referring to this drawing, it will be seen that a portion 10 of the planetary gear transmission mechanism has been shown and that of such mechanism parts of the usual three drums 11, 12 and 13 have been illustrated, drum 11 being the reverse drum, drum 12 the slow speed drum, and drum 13 the foot brake drum, all of which is the usual construction of a Ford automobile.

These several drums are surrounded by their respective bands 14, 15 and 16 suitably lined with friction material of the ordinary nature and structure, the ends of each band being somewhat separated as is usual, one outstanding end 17 only of each band being shown.

The springs 18 for expanding or enlarging the bands are depicted, but the mechanism for selectively contracting the bands individually have not been illustrated since it is well known.

The opening in the top of the transmission casing is closed by an inclined cover 19 held fixedly in place by the usual securing screws 20, 20 and an aperture 21 in such cover accommodates a grease-cup 22 of substantial size and appropriate shape fastened permanently to the cover by rivets 23 extended through suitable holes in the cover and aligned holes in an external flange 24 of the grease-cup, a portion of the latter projecting above the cover and a part extending below the same down into the transmission casing all as is clearly depicted in Figure 1.

The interior of the grease-cup is threaded at 25 with which a threaded plunger 26 coacts, the latter having an upstanding handle 27 by means of which it is readily turned to force the feed of the grease or turned in the opposite direction for its temporary removal for refilling or replenishing the cup.

Two spaced tubes or pipes 28 and 29 communicating with the interior of the grease-cup project downwardly from its lower portion into the spaces between the three bands in register with the gaps between the upturned ends of the latter.

The actual lower ends of such tubes or conduits are closed but one side of member 28 has a downwardly directed orifice 30 which delivers or feeds the grease in a small stream on to the reverse drum 11 by which during its rotation it is soon applied to the lining of the corresponding band 14.

In somewhat similar manner, the tube or pipe 29 is supplied in its opposite sides with a pair of downwardly inclined diverging perforations 31 and 32, each slightly larger in diameter than the aperture 30 and adapted to deliver grease respectively to the drums 12 and 13, the latter in turn applying it to the linings of their surrounding bands.

Inasmuch as the reverse band and drum are used less frequently than the others it needs less grease to maintain it in full operative condition and accordingly orifice 30 is made smaller than the other two and therefore a less quantity of grease is forced through it on to the drum than through the other apertures on to their drums.

The grease thus manually intermittently applied to the bands indirectly by feeding it to the drums does not take the place of the oil bath in which the drums revolve but is supplemental thereto.

It will be seen that by turning the plunger slightly by hand three streams of grease are simultaneously delivered to the same number of drums or cylinders between the spaced ends of their lined bands, the amount of grease so fed being substantially proportional to the respective degrees of use of the bands and the needs of their linings.

Obviously, the invention is not necessarily limited to the precise and exact details of structure shown and described, these being subject to many minor mechanical changes without departure from the substance and essence of the invention and without the sacrifice of any of its substantial benefits and advantages.

The principal aim of the invention is, of course, to supply some suitable means which will enable the operator to easily apply the grease to the band linings, preferably without removing the transmission casing cover, but this may be conveniently accomplished by means other than a grease-cup or by means positioned or mounted or operated other than as illustrated and described.

The cover is of proper size and shape and so supplied with holes for the securing screws that it may be easily substituted for the usual cover over the transmission housing, thus affording the operator simple and efficient means for applying the grease at the points and for the purpose indicated.

I claim:

1. An article of manufacture, comprising in combination, means to permit the manual intermittent delivery of grease to a contractible and expansible band encircling a drum of the transmission mechanism of a motor vehicle of the planetary gear type, and means to support said greasing means in position for the performance of such function.

2. An article of manufacture, comprising in combination, means to permit the manual intermittent delivery of grease simultaneously to a plurality of contractible and expansible bands encircling drums of the transmission mechanism of a motor vehicle of the planetary gear type, and means to support said greasing means in position for the performance of such function.

3. An article of manufacture, comprising in combination, means to permit the manual intermittent delivery of grease in the gap between the ends of a contractible and expansible band encircling a drum of the transmission mechanism of a motor vehicle of the planetary gear type, and means to support said greasing means in position for the performance of such function.

4. An article of manufacture, comprising in combination, means to permit the manual intermittent delivery of grease simultaneously in the gaps between the ends of a plurality of contractible and expansible bands encircling drums of the transmission mechanism of a motor vehicle of the planetary gear type, and means to support said greasing means in position for the performance of such function.

5. An article of manufacture, comprising in combination, a cover for the planetary gear transmission casing of a motor vehicle, and means on said cover to permit the manual intermittent delivery of grease to one or more of the contractible or expansible bands encircling the drums of said transmission mechanism.

6. An article of manufacture, comprising in combination, a cover for the planetary gear transmission casing of a motor vehicle, and manually-operated means on said cover to simultaneously deliver grease in the gaps between the ends of a plurality of the contractible and expansible bands encircling the drums of the transmission mechanism in said casing.

7. An article of manufacture, comprising in combination, a cover for the planetary gear transmission casing of a motor vehicle, and means on said cover to simultaneously deliver different amounts of grease to a plurality of the expansible and contractible bands encircling drums of the transmission mechanism in the casing.

8. An article of manufacture, comprising in combination, a cover for the planetary gear transmission casing of a motor vehicle, and means on said cover projecting between a plurality of the contractible and expansible bands encircling drums of the transmission mechanism of said casing and adapted to deliver grease between the ends of said bands.

9. The combination of a plurality of drums and their cooperating encircling contractible and expansible bands of the transmission mechanism of a motor vehicle of the planetary gear type, and a grease-cup having a plurality of discharge openings positioned and directed to deliver grease to the linings of said bands.

10. The combination of a plurality of drums and their cooperating encircling contractible and expansible bands of the transmission mechanism of a motor vehicle of the planetary gear type, and a manually-operable grease-cup having a plurality of discharge openings of different sizes positioned and directed to deliver grease in different quantities simultaneously to the gaps between the ends of said plurality of bands.

11. The combination of a plurality of drums and their cooperating encircling contractible and expansible bands of the transmission mechanism of a motor vehicle of the planetary gear type, and manually-operated means to apply grease to the lining of each of said bands.

12. The combination of a drum and its cooperating encircling contractible and expansible band of the transmission mechanism of a motor vehicle of the planetary gear type, and manually-operated means to apply grease to the lining of said band.

ARTHUR J. EVERS.